US008699818B2

(12) United States Patent
Yamada (10) Patent No.: US 8,699,818 B2
(45) Date of Patent: Apr. 15, 2014

(54) METHOD, SYSTEM, AND PROGRAM FOR DETERMINING IMAGE QUALITY BASED ON PIXEL CHANGES BETWEEN IMAGE FRAMES (75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 12/922,730

(22) PCT Filed: Apr. 28, 2009

(86) PCT No.: PCT/JP2009/058337
§ 371 (c)(1),
(2), (4) Date: Sep. 15, 2010

(87) PCT Pub. No.: WO2009/133879
PCT Pub. Date: Nov. 5, 2009

(65) Prior Publication Data
US 2011/0007968 A1  Jan. 13, 2011

(30) Foreign Application Priority Data
Apr. 30, 2008 (JP) ................................. 2008-118347

(51) Int. Cl.
G06K 9/64 (2006.01)

(52) U.S. Cl.
USPC ....................................... 382/278

(58) Field of Classification Search
None
See application file for complete search history.

(56) References Cited

U.S. PATENT DOCUMENTS 6,239,834 B1    5/2001  Miyaji et al.
6,678,424 B1    1/2004  Ferguson
2003/0123549 A1* 7/2003  Yang et al. ............... 375/240.16
2004/0183950 A1  9/2004  Sugimoto et al.
2006/0083433 A1* 4/2006  Kato ............................. 382/232
2006/0280427 A1* 12/2006 Snowdon et al. ............. 386/46
2007/0098379 A1* 5/2007  Wang et al. .................... 396/14
2009/0076369 A1* 3/2009  Mistretta ...................... 600/407

FOREIGN PATENT DOCUMENTS

| JP | 8205156 A | 8/1996 |
|---|---|---|
| JP | 937242 A | 2/1997 |
| JP | 09-307930 A | 11/1997 |
| JP | 3458600 B2 | 11/1997 |
| JP | 10200872 A | 7/1998 |
| JP | 2000201354 A | 7/2000 |
| JP | 2001-197527 A | 7/2001 |
| JP | 2004-260602 A | 9/2004 |
| JP | 2006201983 A | 8/2006 |
| JP | 2007-110189 A | 4/2007 |
| JP | 2007110189 A * | 4/2007 |
| WO | 2006043500 A1 | 4/2006 |

OTHER PUBLICATIONS

Office Action date Oct. 2, 2013 issued by the Japanese Patent Office in counterpart Japanese Application No. 2010510131.

* cited by examiner

Primary Examiner — Bhavesh Mehta
Assistant Examiner — Andrew Moyer
(74) Attorney, Agent, or Firm — Sughrue Mion, PLLC (57) ABSTRACT Disclosed is a picture quality evaluation method with which the amount of pixel change in a pixel set of a specified size is calculated between specified frames of a first image, and weighting processing based on the amount of pixel change is applied to a first picture quality value calculated based on specified data from the first image between at least the aforementioned specified frames to calculate a second picture quality value for the first image.

23 Claims, 6 Drawing Sheets

PIXEL GROUP IN PRECEDING FRAME

PIXEL GROUP IN CURRENT
FRAME AT SAME POSITION

OBJECT IN PIXEL GROUP (WITH
MOTION BY TWO PIXELS IN
HORIZONTAL DIRECTION)

METHOD, SYSTEM, AND PROGRAM FOR DETERMINING IMAGE QUALITY BASED ON PIXEL CHANGES BETWEEN IMAGE FRAMES

CROSS REFERENCE TO RELATED APPLICATIONS

This application is a National Stage of International Application No. PCT/JP2009/058337 filed Apr. 28, 2009, claiming priority based on Japanese Patent Application No. 2008-118347 filed Apr. 30, 2008, the contents of all of which are incorporated herein by reference in their entirety.

TECHNICAL FIELD

The present invention relates to an image evaluation method, an image evaluation system and a program.

BACKGROUND ART

Methods of objectively evaluating image quality of videos include methods of using the absolute difference, squared difference, and S/N ratio of pixel values (luminance, a color difference, an RGB value, etc.) between an original image and an image of interest for evaluation. For example, an image quality evaluation method disclosed in Patent Document 1 uses the S/N ratio while taking account of human visual properties varying with the spatial frequency, and determines an objective image quality value by calculating an S/N ratio based on a differential value between a pixel value of data of an image of interest for evaluation and that of its original image, and applying a weight to the S/N ratio based on the power of the alternating-current components for the image data in a whole frame.

The image quality evaluation method as disclosed in Patent Document 1, however, does not take account of visual properties with respect to a change in video signals in a temporal direction, and therefore, the correlation with the result of actual subjective evaluation is not always high.

Another image quality evaluation method is disclosed in Patent Document 2. The image quality evaluation method as disclosed in Patent Document 2 determines, for example, a difference in pixel value between consecutive frames on a pixel-by-pixel basis, and applying weighting processing to the S/N ratio based on the magnitude of the difference.

Patent Document 1: JP-3458600B2
Patent Document 2: JP-P2007-110189A

DISCLOSURE OF THE INVENTION

Problems to be Solved by the Invention

In a case that a subtle motion is present between frames in an image of interest for evaluation, it is easy for the human vision to detect image quality degradation as well as that without motion because the human vision is able to follow the motion. Thus, it is necessary to apply the same weighting processing when a subtle motion is present as that without motion.

Since the image quality evaluation method as disclosed in Patent Document 2, however, determines a pixel change amount on a pixel-by-pixel basis, the method decides that the change amount is large in the proximity of a border of an object lying within the image in a case that a subtle motion is present between frames in the image of interest for evaluation. Since the weighting processing is applied according to the decision, inappropriate weighting processing is applied in the proximity of the border, resulting in a problem that the correlation between subjective image quality and objective image quality is lowered.

Thus, the present invention has been made in view of such a problem, and its object is to provide an image quality evaluation method, an image quality evaluation system, and a program with which a change between frames in a video can be correctly evaluated, and the magnitude of the change can be incorporated in a result of objective image quality evaluation.

Means for Solving the Problems

The present invention for solving the aforementioned problem is an image quality evaluation method, characterized in comprising: calculating a pixel change amount in a pixel group having a predetermined size between predetermined frames in a first image; and based on said pixel change amount, applying weighting processing to a first image quality value calculated based on predetermined data in the first image between at least said predetermined frames to calculate a second image quality value of said first image.

The present invention for solving the aforementioned problem is an image quality evaluation system, characterized in comprising: a pixel change amount calculating section for calculating a pixel change amount in a pixel group having a predetermined size between predetermined frames in a first image; and an image quality value calculating section for, based on said pixel change amount, applying weighting processing to a first image quality value calculated based on predetermined data in the first image between at least said predetermined frames to calculate a second image quality value of said first image.

The present invention for solving the aforementioned problem is a program, characterized in causing an information processing apparatus to execute: pixel change amount calculation processing of calculating a pixel change amount in a pixel group having a predetermined size between predetermined frames in a first image; and image quality value calculation processing of, based on said pixel change amount, applying weighting processing to a first image quality value calculated based on predetermined data in the first image between at least said predetermined frames to calculate a second image quality value of said first image.

Effects of the Invention

An effect of the present invention is that objective image quality evaluation having a high correlation with subjective evaluation can be provided.

EXPLANATION OF SYMBOLS

10 First image quality value calculating section
11 Inter-frame pixel change amount calculating section
12 First image quality value weighting section
13 Second image quality value calculating section

BEST MODES FOR CARRYING OUT THE INVENTION

Several embodiments of the present invention will be described hereinbelow.

First Embodiment

This embodiment is characterized in calculating a pixel change amount in a pixel group having a predetermined size between predetermined frames in a first image. It is also characterized in then calculating a first image quality value based on predetermined data in the first image between at least the predetermined frames, and applying weighting processing to the first image quality value based on the calculated pixel change amount to evaluate image quality of the first image based on a second image quality value obtained from the weighting processing.

Figure 1:
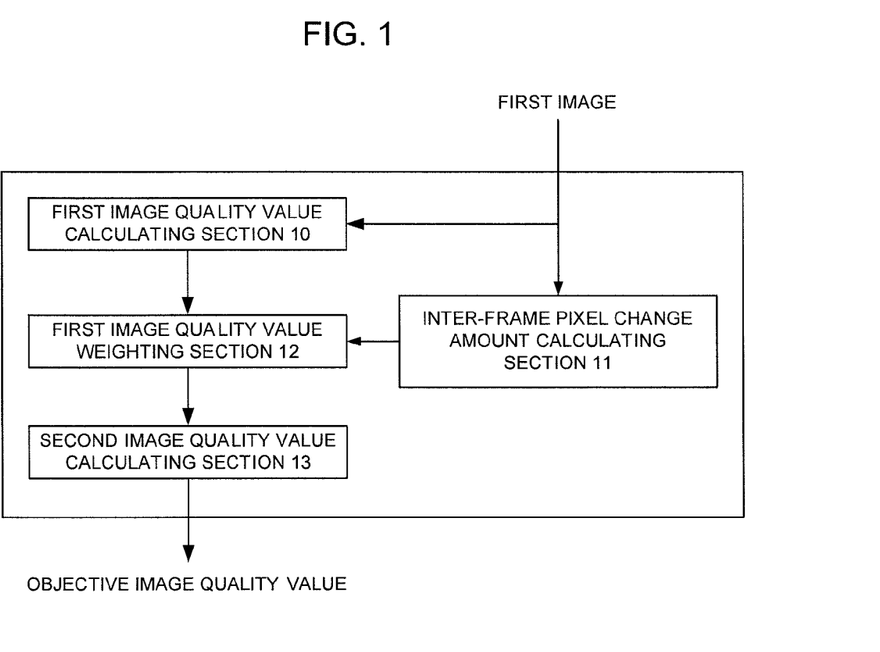
FIG. 1 is a block diagram of an image evaluation system in a first embodiment.

As shown in FIG. 1, an evaluation system in the first embodiment comprises a first image quality value calculating section 10, an inter-frame pixel change amount calculating section 11, a first image quality value weighting section 12, and a second image quality value calculating section 13.

The first image quality value calculating section 10 calculates a first image quality value based on at least predetermined data in a first image. The data employed is not limited to the data in the first image, which is an image of interest for evaluation, and image data of a whole second image, which is an image for comparison (for example, original image), or the feature of the second image may be employed. The first image quality value to be calculated is a numeric value representing, for example, the amount of block distortion, the amount of blurring, or the amount of degradation due to missing data caused by transmission errors. It may also be a differential value between the first image and second image for each predetermined pixel group (block: for example, 16 pixels by 16 pixels, etc). The differential value may be obtained by calculating a difference in pixel value, such as luminance, a color difference, or RGB, on a pixel by pixel basis at the same pixel position, or by calculating a difference in average of pixel values obtained for each predetermined pixel group, or a difference in statistical quantity of alternating-current components in an image group (for example, the statistical quantity may be a value obtained by determining an average of pixel values of pixels in a pixel group, and calculating an average of absolute differences between the average and every pixel value in the pixel group, or may be a variance of pixel values in the pixel group). Alternatively, it may be determined as a difference in transform factor after applying orthogonal transform to the pixel group.

The inter-frame pixel change amount calculating section 11 calculates a pixel change amount in a pixel group between a plurality of predetermined frames. The pixel change amount in the pixel group is represented as a sum of absolute differences in pixel value including any one of the luminance, a color difference and an RGB value, within the pixel group at the same pixel position between the plurality of predetermined frames (sum of inter-frame absolute differences). Moreover, it may be represented as an average of absolute differences per pixel. In the following description, the value calculated at the inter-frame pixel change amount calculating section 11 will be sometimes referred to as inter-frame pixel change amount. It should be noted that the size of the pixel group for which an inter-frame pixel change amount is determined may be different from the unit size of the first image quality value. When thus adopting different sizes, the pixel group may be defined as, for example, 16 by 16 pixels, which is a coding unit, for the first image quality value, or defined to conform to, for example, the shape of an object in a frame for the inter-frame pixel change amount, whereby the inter-frame pixel change amount can be more accurately calculated, and degradation specific to coding, such as block distortion, can be calculated.

Moreover, in a case that the first image quality value is a frame-based value, an average of the inter-frame pixel change amounts of the image groups may be calculated per unit frame. For the plurality of predetermined frames described above, for example, a frame to which image quality evaluation is to be applied (current frame), and its immediately preceding frame are employed; however, the plurality of predetermined frames employed are not limited thereto, and may be the current frame, and a frame apart from the current frame at a predetermined distance. A distance of two, three, four or five frames, or the like may be employed. At a higher frame rate (the number of frames contained within one second), in a case that the pixel change is significant between frames at a distance of several frames, image quality degradation that has occurred is difficult to detect, so that weighting processing is desirably introduced also in such a case.

Moreover, for the plurality of predetermined frames described above, three frames or more may be employed. For example, three frames including the current frame (at time t), an immediately preceding frame (time t-1), and a second preceding frame (time t-2) may be employed to calculate a pixel change amount between frames at time t and time t-1 and a pixel change amount between frames at time t-1 and time t-2, and the statistical quantity, such as an average of the two pixel change amounts, may be regarded as a pixel change amount at time t.

Based on the inter-frame pixel change amount calculated at the inter-frame pixel change amount calculating section 11, the first image quality value weighting section 12 applies weighting processing to the first image quality value calculated at the first image quality value calculating section 10. The weighting processing is applied by comparing an inter-frame pixel change amount with a predetermined threshold, and in a case that the inter-frame pixel change amount is smaller than the threshold, applying a weight to the first image quality value calculated between predetermined frames for which the inter-frame pixel change amount was calculated, by multiplying it by, for example, a predetermined constant equal to or greater than one, because the pixel change between frames is small enough to make faint image quality degradation easily detectable.

On the other hand, in a case that the inter-frame pixel change amount is greater than the threshold, weighting processing is applied by multiplying the first image quality value by, for example, a predetermined constant equal to or smaller than one, because the pixel change between frames is too large to make image quality degradation easily detectable. The number of kinds of the thresholds may be more than one, and in such a case multi-stage control of weighting processing is allowed.

The weight may also be determined by a predetermined function with a variable of the inter-frame pixel change amount. The unit for the weighting processing is determined as follows: in a case that the first image quality value is obtained on an image group-by-image group basis, the weighting processing is applied on an image group-by-image group basis, or in a case that the first image quality value is obtained on a frame-by-frame basis, the weighting processing is applied on a frame-by-frame basis. Moreover, the weighting processing may be applied to a predetermined number of frames subsequent to the current frame in a case that a pixel change between frames is decided to be large. This is because the phenomenon that image quality degradation becomes difficult to detect for a larger pixel change between frames is encountered not only within one frame at the time at which a pixel change between frames is decided to be large but also over several subsequent frames. For example, the weighting processing is applied to five subsequent frames.

The second image quality value calculating section 13 calculates a second image quality based on the weighted first image quality value. The second image quality is output as an average of first image quality values over, for example, a whole video or for each predetermined frame. It should be noted that the second image quality may be a value other than the average. For example, it may be output as an S/N ratio.

According to the first embodiment, objective image quality evaluation having a high correlation with subjective evaluation can be provided. This is because a change in pixel value between frames is calculated for each predetermined pixel group, rather than on a pixel-by-pixel basis, whereby a change in pixel value between frames can be correctly calculated in the proximity of the border of an object lying within an image even in a case that a subtle motion is present between frames, and such a pixel change amount is used in calculation of an objective image quality value.

Second Embodiment

A second embodiment is an embodiment in which the present invention is applied to an FR (Full Reference) scheme or an RR (Reduced Reference) scheme. Moreover, the following description will address a case of obtaining an inter-frame pixel change amount between a pixel group in a frame to which image quality evaluation is to be applied (the current frame), and that in a frame temporally precedent to the current frame by one frame, at the same position.

Figure 2:
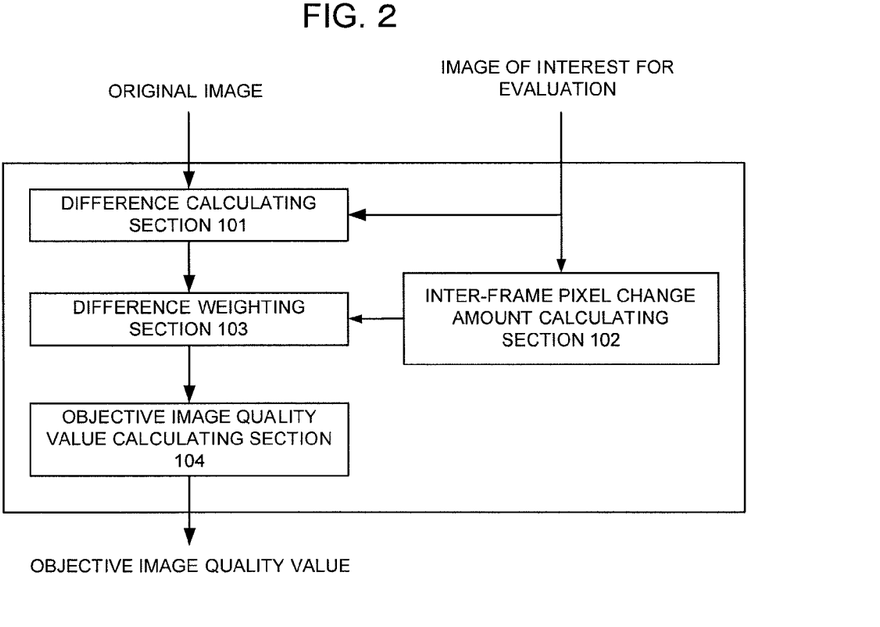
FIG. 2 is a block diagram of an image evaluation system in a second embodiment.

Referring to FIG. 2, an image quality evaluation system in the second embodiment is comprised of: a difference calculating section 101 for determining a difference between an original image and an image of interest for evaluation for each predetermined pixel group; an inter-frame pixel change amount calculating section 102 for determining a change in pixel value between adjacent frames in the image of interest for evaluation for each predetermined pixel group; a difference weighting section 103 for applying weighting processing to the difference calculated at the difference calculating section 101 based on the calculated pixel change amount between frames; and an objective image quality value calculating section 104 for determining an objective image quality value based on the weighted differences.

The difference calculating section 101 calculates a differential value based on information on one frame of an input original image and that of an input image of interest for evaluation. The differential value is calculated for each predetermined pixel group (for example, 16 by 16 pixels). The differential value may be obtained by calculating a difference in pixel value, such as luminance, a color difference, or RGB, on a pixel by pixel basis at the same pixel position between an original image and an image of interest for evaluation, or by calculating a difference in average of pixel values obtained for each predetermined pixel group, or a difference in statistical quantity of alternating-current components in an image group (for example, the statistical quantity may be a value obtained by determining an average of pixel values of pixels in a pixel group, and calculating an average of absolute differences between the average and every pixel value in the pixel group, or may be a variance of pixel values in the pixel group).

Alternatively, it may be determined as a difference in transform factor after applying orthogonal transform to the pixel group. The differential value is calculated here in the form of an absolute difference, squared difference, or the like.

In such a case that video transmission is involved, not all pixels may be referred to in either or both of the original image or image of interest for evaluation, and the differential value is calculated at a pixel position that can be referred to.

The inter-frame pixel change amount calculating section 102 calculates a pixel change between a frame being currently processed and an immediately preceding frame in the image of interest for evaluation for each predetermined pixel group. The pixel change is represented as a sum of absolute differences in any one of luminance, a color difference and an RGB value, on a pixel-by-pixel basis within the pixel group (sum of inter-frame absolute differences), or as an average of the absolute differences per pixel. While the sum of inter-frame absolute differences is employed here as the inter-frame pixel change amount, other values may be employed insofar as the inter-frame pixel change amount is obtained for each predetermined pixel group. For example, a value such as sum of squared differences may be employed.

It should be noted that the size of the pixel group for which an inter-frame pixel change amount is determined may be different from the size of the pixel group for which an average of pixel values or a statistical quantity of the alternating-current components is calculated. When thus adopting different sizes, the pixel group may be defined as, for example, 16 by 16 pixels, which is a coding unit, for the differential value, or defined to conform to, for example, the shape of an object in a frame for the inter-frame pixel change, whereby the inter-frame pixel change can be more accurately calculated, and degradation specific to coding, such as block distortion, can be calculated.

The difference weighting section 103 applies weighting processing to the differential values calculated at the difference calculating section 101. The weighting processing is achieved based on the inter-frame pixel change amount calculated at the inter-frame pixel change amount calculating section 102. The weighting processing is applied by comparing an inter-frame pixel change amount with a predetermined threshold, and in a case that the inter-frame pixel change amount is smaller than the threshold, multiplying the differential value of a corresponding pixel group by, for example, a predetermined constant equal to or greater than one, because the pixel change between frames is small enough to make faint image quality degradation easily detectable. On the other hand, in a case that the inter-frame pixel change amount is greater than the threshold, weighting processing is applied by multiplying the differential value of corresponding pixel groups by, for example, a predetermined constant equal to or smaller than one, because the pixel change between frames is too large to make image quality degradation easily detectable. The number of kinds of the thresholds may be more than one, and in such a case multi-stage control of weighting processing is allowed. The weight may also be determined by a predetermined function with a variable of the inter-frame pixel change amount.

The objective image quality value calculating section 104 calculates an objective image quality value based on the weighted differential values. The objective image quality value is output as a value such as an average of differential values for every predetermined number of frames, the number being at least one. For example, the objective image quality value is output as an average for each frame, an average over a predetermined frame interval (an average per unit frame in a predetermined number of frames), or an average in a whole video. It should be noted that the objective image quality value based on an alternating-current component differential value may be a value other than the average. For example, it may be output as an S/N ratio obtained with a denominator of squared difference value (alternating-current component differential value), and calculating a logarithm thereof.

Figure 3:
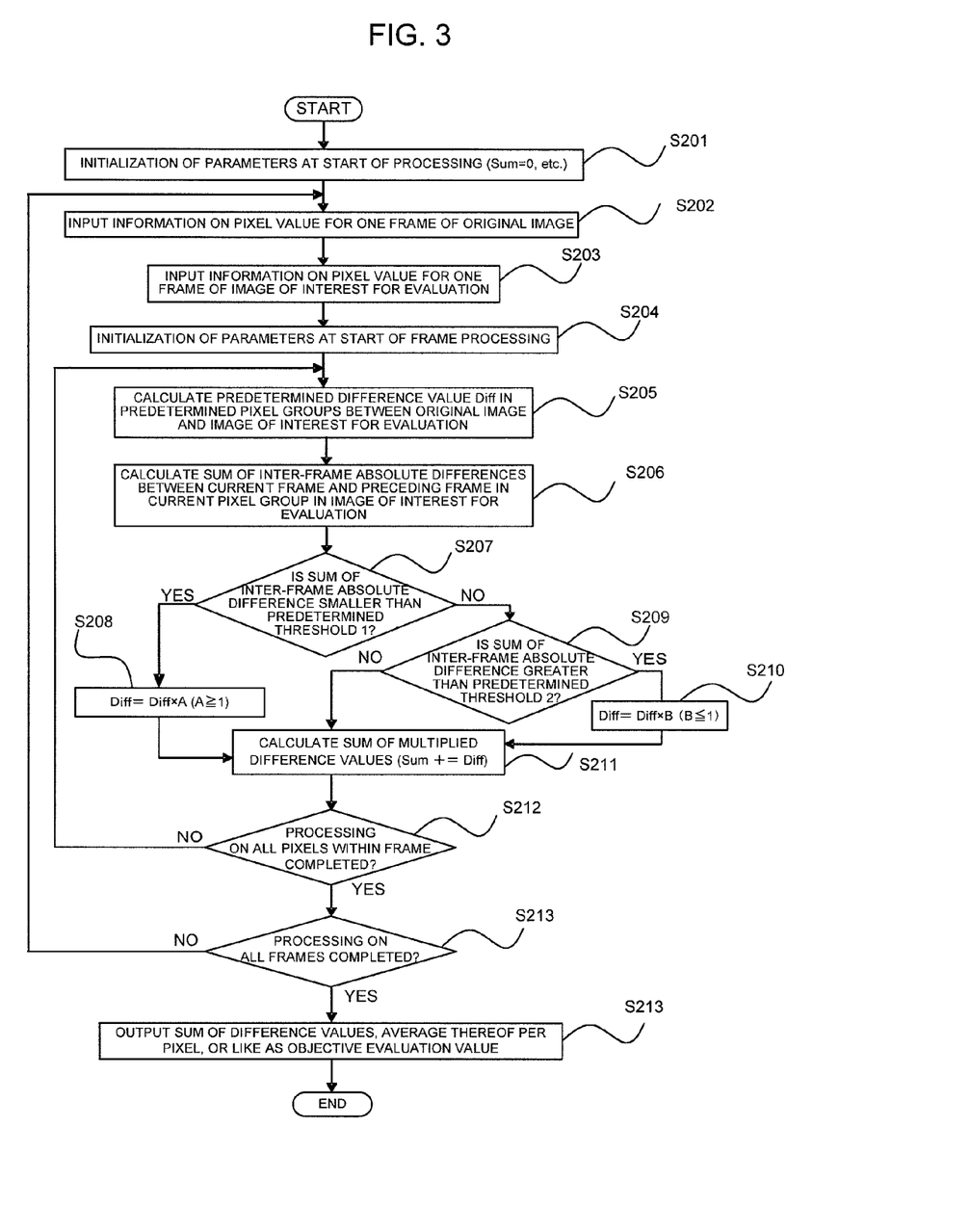
FIG. 3 is a flow chart of an operation of the image evaluation system in the second embodiment.

FIG. 3 shows an operation of the image quality evaluation system in the second embodiment in a flow chart.

First, initialization is performed on parameters required in image quality evaluation processing (S201). At this step, for example, initialization of a pointer indicating a frame position, and zero reset of parameters for saving the sum of differential values to be calculated are performed.

Image data of one frame of an original image is input to the image quality evaluation system (S202). Likewise, pixel data of one frame of an image of interest for evaluation is also input to the image quality evaluation system (S203).

Next, initialization of parameters required in performing image quality evaluation processing for one frame is performed (S204). For example, initialization of a parameter indicating the position of the pixel group being processed is performed here.

Then, a differential value between the original image and the image of interest for evaluation is calculated for each predetermined pixel group by a predetermined method (S205). It is assumed here that a differential value Diff is calculated as a difference of an average of pixel values obtained for each pixel group.

For the pixel group, a sum of inter-frame absolute differences (inter-frame pixel change amount) is calculated for a pixel group in a frame being currently processed and that in a frame temporally precedent to the current frame by one frame, at the same position in the image of interest for evaluation (S206). Then, a decision is made as to whether the sum of inter-frame absolute differences (inter-frame pixel change amount) is smaller than a predetermined threshold 'a' (S207). In a case that the sum is decided to be smaller than the threshold 'a,' the differential value Diff is multiplied by a constant A equal to or greater than one (S208).

On the other hand, in a case that the sum is not decided to be smaller than the threshold 1, a decision is made as to whether the sum of inter-frame absolute differences (inter-frame pixel change amount) is greater than a threshold 'b' at S209. In a case that the sum is decided to be greater than the threshold 'b,' the differential value Diff is multiplied by a constant B equal to or smaller than one (S210).

Next, the sum of differential values Diff up to the time of the processing on the current pixel group is calculated (S211). Then, a check is made as to whether the differential calculation is completed for all pixel groups within one frame (S212). In a case that the calculation is not completed, a pointer to the pixel group is advanced to a next pixel group, and the process goes back to S205 to continue the processing.

On the other hand, in a case that the calculation is completed, a check is made as to whether the processing is completed for all frames in the video at S213. In a case that the processing is not completed, a pointer to the frame is advanced to a next frame, and the process goes back to S202 to continue similar processing on a subsequent frame.

In a case that the processing is completed for all frames, an average or the like of alternating-current component differential values per pixel group is calculated for the image groups (the whole video) at the objective image quality value calculating section 104, the resulting value is output as an objective image quality value (S214), and the processing is terminated.

Subsequently, a specific example of the second embodiment will be described hereinbelow.

A moving picture 1 of an SDTV size (720 pixels in a horizontal direction, 480 pixels in a vertical direction, and 29.97 frames per second), and a moving picture 2 obtained by encoding the moving picture 1 in an MPEG-2 format at 4 Mbps and decoding the encoded image are input to the image quality evaluation system illustrated in FIG. 2.

The difference calculating section 101 divides each of frames of the images at the same time such that one frame is divided into pixel groups each having 16 pixels in a horizontal direction by 16 pixels in a vertical direction (45 by 30 blocks), and calculates a statistical quantity of the alternating-current components in each pixel group. A statistical quantity $X_n$ of the alternating-current components for block 'n' is calculated by determining an average Y of luminance values for 16×16=256 pixels, and calculating an average of the absolute differences between the average Y of the luminance values and an luminance value for each of 256 pixels.

Next, the difference calculating section 101 calculates an absolute difference $D_n$ (which will be referred to as alternating-current component absolute difference hereinbelow) as an alternating-current component differential value of the statistical quantity of the alternating-current components between pixel groups in the same frame and at the same position for the original image and image of interest for evaluation. For example, in a case that the alternating-current component for the original image is ten and that for the image of interest for evaluation is eight, the alternating-current component absolute difference $D_n$ is two. The processing is repeated for all pixel groups in the frame to calculate an alternating-current component absolute difference $D_n$.

Figure 4:
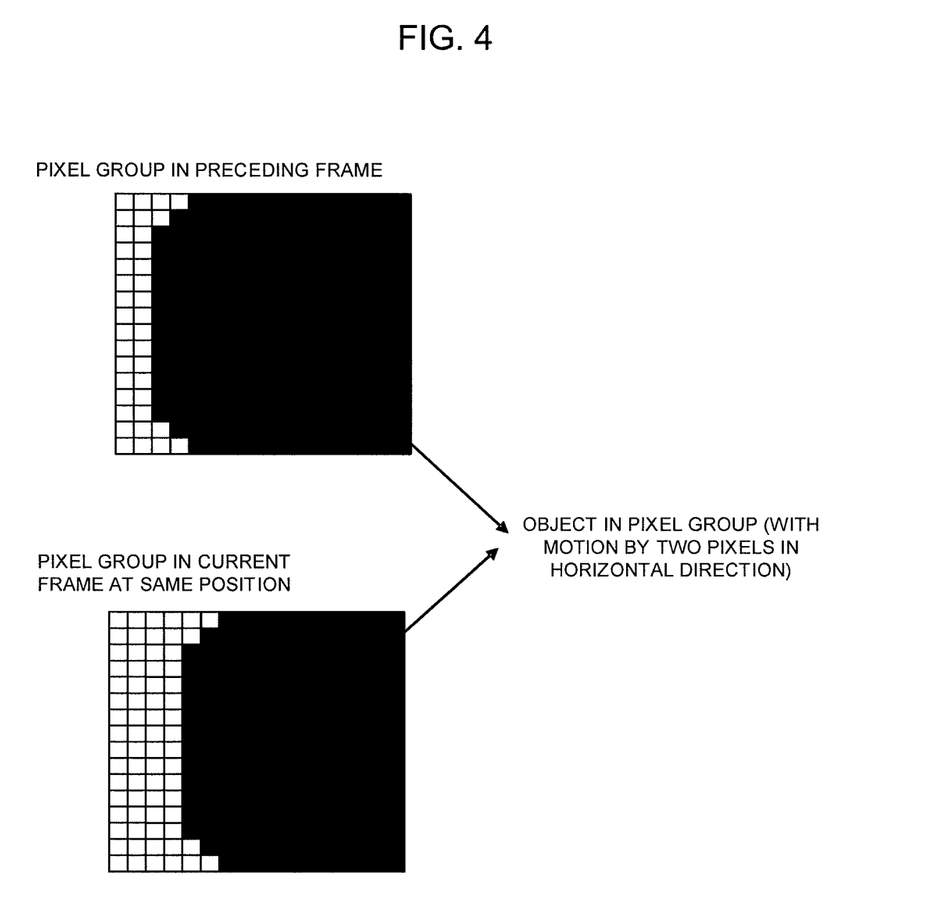
FIG. 4 is a diagram for explaining a specific example of the second embodiment.

Next, the inter-frame pixel change amount calculating section 102 divides a frame of interest for evaluation into pixel groups each having 16 pixels in a horizontal direction by 16 pixels in a vertical direction (45×30 blocks) for each frame, and calculates a sum of inter-frame absolute differences (inter-frame pixel change amount) for luminance values between a pixel group in the current frame and that in a frame precedent to the current frame by one frame at the same position. For example, assume that the pixel group contains an object having a motion by two pixels in a horizontal direction between the frames, and the border of the object lies within the pixel group. As shown in FIG. 4, the motion by two pixels results in a larger inter-frame absolute difference in luminance of each pixel in the border area.

In the image quality evaluation method based on Patent Document 2, a pixel having a larger absolute difference results in a larger pixel change between frames, which leads to a decision that image quality degradation is difficult to detect. On the other hand, in the present case, a pixel change between frames is decided based on a sum of absolute differences for 16 pixels in a horizontal direction by 16 pixels in a vertical direction, so that the decision is affected by the absolute differences in areas other than the border area, leading to a decision that a change is insignificant even in the border area.

Next, the difference weighting section 103 applies weighting processing to the alternating-current component absolute difference $D_n$ for each pixel group. First, the sum of inter-frame absolute differences (inter-frame pixel change amount) is compared with a threshold. Assume that the threshold 1 is 2560 and the threshold 2 is 5120, and a weight W1 is 5.0 when the sum of inter-frame absolute differences (inter-frame pixel change amount) is smaller than the threshold 1, and a weight W2 is 0.25 when the sum of inter-frame absolute differences (inter-frame pixel change amount) is greater than the threshold 2. A weight is determined according to comparison with respect to a threshold, and the alternating-current component absolute difference $D_n$ is multiplied by the weight.

The objective image quality value calculating section 104 receives the weighted alternating-current component absolute difference $D_n$ as input, and calculates an average of the alternating-current component absolute differences per pixel group from a total sum of the alternating-current component absolute differences $D_n$ and the number of the processed pixel groups, which average value is output as an objective image quality value.

Third Embodiment

Next, a third embodiment of the present invention will be described below in detail. The following description will address a case of determining an inter-frame pixel change amount between a pixel group in a frame to be subjected to image quality evaluation (current frame) and that in a frame temporally precedent to the current frame by one frame at the same position.

Figure 5:
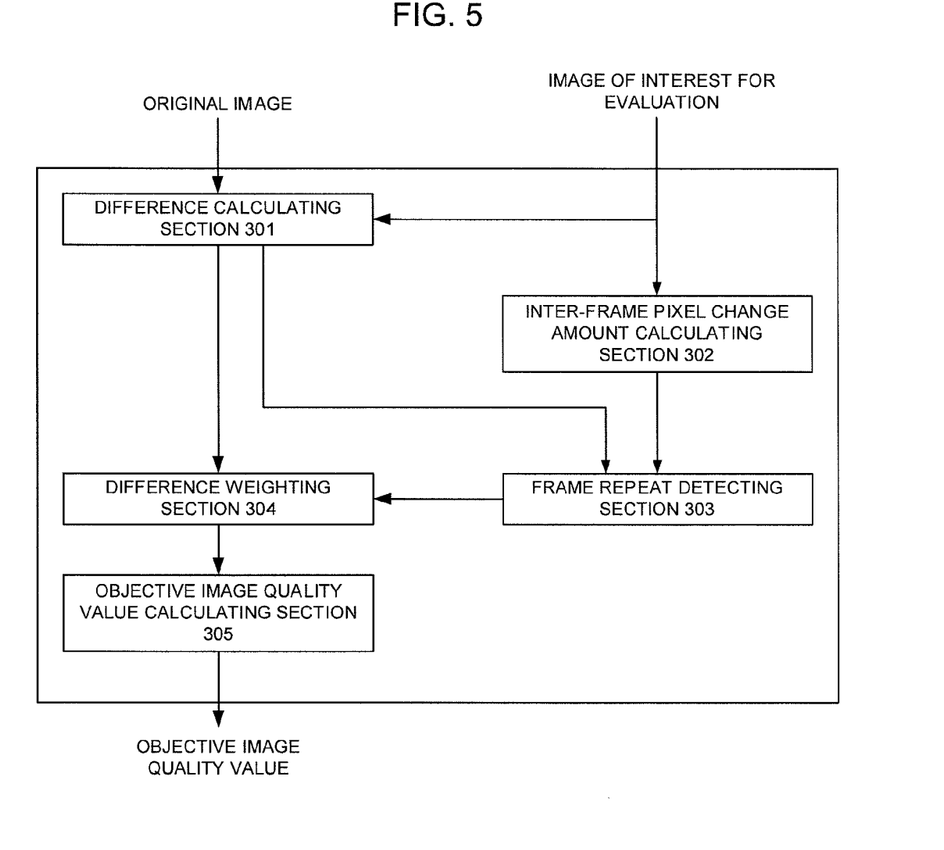
FIG. 5 is a block diagram of an image evaluation system in a third embodiment.

Referring to FIG. 5, an image quality evaluation system of the present invention is comprised of: a difference calculating section 301 for determining a differential value between an original image and an image of interest for evaluation for each predetermined pixel group; an inter-frame pixel change amount calculating section 302 for determining a change in pixel value between adjacent frames in the image of interest for evaluation for each predetermined pixel group; a frame repeat detecting section 303 for deciding whether the frame in the image of interest for evaluation is a duplicate of the preceding frame based on the differential value calculated at the difference calculating section 301 and the inter-frame pixel change amount calculated at the inter-frame pixel change amount calculating section 302; a difference weighting section 304 for applying weighting processing to the differential value based on the presence of the detected frame repeat; and an objective image quality value calculating section 305 for determining an objective image quality value based on a result of the weighted differential value.

The difference calculating section 301 calculates a differential value based on information on one frame of an input original image and that of an image of interest for evaluation. The differential value is calculated for each predetermined pixel group (for example, 16 by 16 pixels).

The differential value may be obtained by calculating a difference in pixel value, such as luminance, a color difference, or RGB, on a pixel by pixel basis at the same pixel position in the original image and image of interest for evaluation, or by calculating a difference in average of pixel values obtained for each predetermined pixel group, or a difference in statistical quantity of alternating-current components in an image group (for example, the statistical quantity may be a value obtained by determining an average of pixel values of pixels in a pixel group, and calculating an average of absolute differences between the average and every pixel value in the pixel group, or may be a variance of pixel values in a pixel group). Alternatively, it may be determined as a difference in transform factor after applying orthogonal transform to the pixel group. The differential value is calculated here in the form of an absolute difference, squared difference, or the like. In such a case that video transmission is involved, not all pixels may be referred to in either or both of the original image or image of interest for evaluation, and the differential value is calculated at a pixel position that can be referred to.

The inter-frame pixel change amount calculating section 302 calculates a pixel change between a frame being currently processed and an immediately preceding frame in the image of interest for evaluation for each predetermined pixel group. The pixel change is represented as a sum of absolute differences in any one of luminance, a color difference and an RGB value, on a pixel-by-pixel basis within the pixel group (sum of inter-frame absolute differences), or as an average of the absolute differences per pixel. While the sum of inter-frame absolute differences is employed here as the inter-frame pixel change amount, other values may be employed insofar as the inter-frame pixel change amount is determined for each predetermined pixel group. For example, a value such as sum of squared differences may be employed. It should be noted that the size of the pixel group for which an inter-frame pixel change amount is determined may be different from the size of the pixel group for which an average of pixel values or a statistical quantity of the alternating-current components is calculated. When thus adopting different sizes, the pixel group may be defined as, for example, 16 by 16 pixels, which is a coding unit, for the differential value, or defined to conform to, for example, the shape of an object in a frame for the inter-frame pixel change, whereby the inter-frame pixel change can be more accurately calculated, and degradation specific to coding, such as block distortion, can be calculated.

The frame repeat detecting section 303 decides whether the image of interest for evaluation is a duplicate of the data in the preceding frame due to a missing frame. In particular, it checks whether the sum of inter-frame absolute differences is zero. In a case that the sum is not zero, it is decided that no frame repeat due to a missing frame is present. In a case that the sum is zero, the differential value calculated at the difference calculating section 301 is compared with a predetermined threshold. In a case that the differential value is greater than the predetermined threshold, temporal alignment (coincidence of the display time for frames) is possibly not achieved between the frame being currently processed in the original image and that in the image of interest for evaluation, so that it is decided that a frame repeat is present in the image of interest for evaluation due to a missing frame.

The difference weighting section 304 applies weighting processing to the differential values calculated at the difference calculating section 301. The weighting processing is controlled according to the presence/absence of a frame repeat due to a missing frame. In a case that a frame repeat is decided to be present, temporal alignment is not achieved between a frame of the original image and that of the image of interest for evaluation used in calculating the difference at the difference calculating section 301, so that a differential value is decided to be incorrectly calculated, which is multiplied by zero to ignore the difference calculated for the current pixel group.

The objective image quality value calculating section 305 calculates an objective image quality value based on the weighted differential values. The objective image quality value is output as an average of differential values for every predetermined number of frames, the number being at least one. For example, the objective image quality value is output as an average for each frame, an average over a predetermined frame interval (an average per unit frame in a predetermined number of frames), or an average in a whole video. It should be noted that the objective image quality value may be a value other than the average. For example, it may be output as an S/N ratio obtained with a denominator of the squared difference value (alternating-current component differential value), and calculating a logarithm thereof.

According to this embodiment, precision in image quality evaluation can be improved by excluding a differential value calculated when temporal alignment is not achieved. A reason of this is that when temporal alignment is not achieved, it is not appropriate to evaluate image quality based on a difference between a frame in an original image and that in an image of interest for evaluation because these frames should be displayed at different times (timing).

Fourth Embodiment

Next, a fourth one of the best modes for carrying out the invention of the present invention will be described in detail with reference to FIG. 6.

In the fourth embodiment, the image quality evaluation system described regarding the first embodiment is implemented by a computer system.

Figure 6:
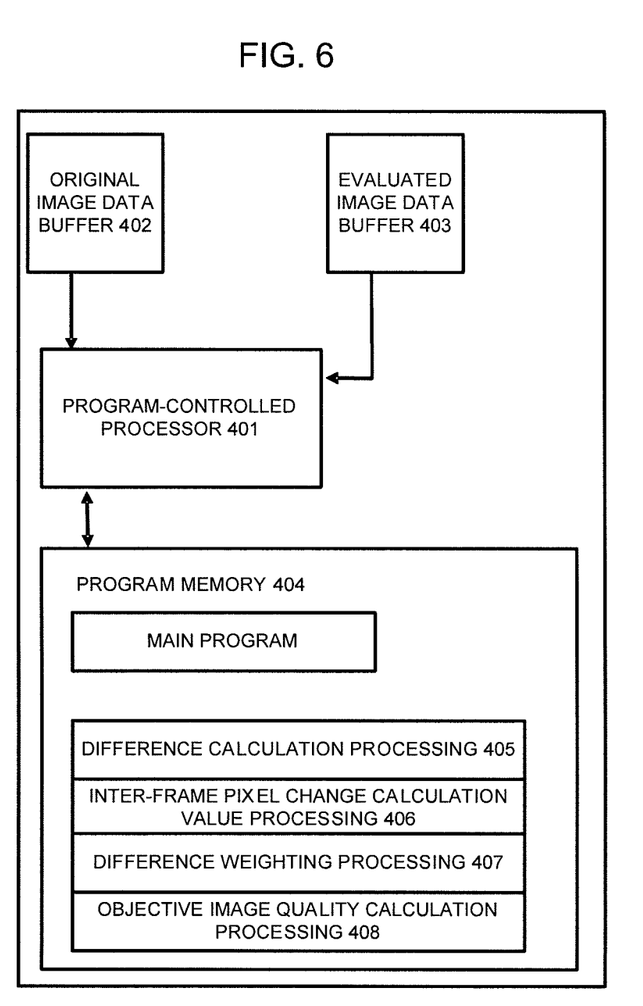
FIG. 6 is a block diagram of an image evaluation system in a fourth embodiment.

Referring to FIG. 6, the present system is provided with a program-controlled processor 401. The program-controlled processor 401 is connected with an original image data buffer 402 and an evaluated image data buffer 403, as well as a program memory 404 for storing therein required programs.

Program modules stored in the program memory 404 comprise a main program, as well as those for difference calculation processing 405, inter-frame pixel change amount calculation processing 406, difference weighting processing 407, and objective image quality value calculation processing 408.

The main program is a principal program for executing the image quality evaluation processing.

The program modules for the difference calculation processing 405, inter-frame pixel change amount calculation processing 406, difference weighting processing 407, and objective image quality value calculation processing 408 implement the functions of the difference calculating section 101, inter-frame pixel change amount calculating section 102, difference weighting section 103, and objective image quality value calculating section 104.

Likewise, for the second embodiment, program modules that implement the functions of several sections described earlier can be implemented in the computer system described above, whereby the second embodiment can be implemented on the computer system.

Fifth Embodiment

A fifth embodiment of the present invention will be described in detail with reference to FIG. 7.

The fifth embodiment is an embodiment in which the present invention is applied to a No (No Reference) scheme. The following description will address a case of determining an inter-frame pixel change amount between a pixel group in a frame to be subjected to image quality evaluation (current frame) and that in a frame temporally precedent to the current frame by one frame at the same position.

Figure 7:
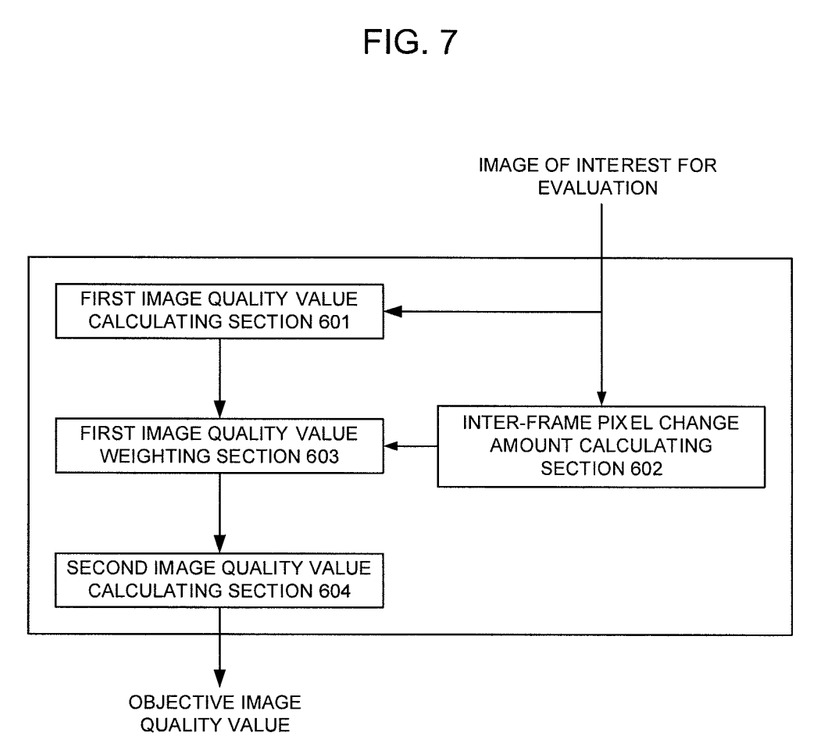
FIG. 7 is a block diagram of an image evaluation system in a fifth embodiment.

Referring to FIG. 7, the image quality evaluation system in the fifth embodiment is comprised of: a first image quality value calculating section 601 for analyzing an image of interest for evaluation to calculate a first image quality value; an inter-frame pixel change amount calculating section 602 for determining a change in pixel value between adjacent frames in the image of interest for evaluation for each predetermined pixel group; a first image quality value weighting section 603 for applying weighting processing to the first image quality value based on the calculated inter-frame pixel change amount; and a second image quality value calculating section 604 for determining an objective image quality value (second image quality value) based on a result of the weighted first image quality value.

The first image quality value calculating section 601 receives information on one frame of an image of interest for evaluation as input, and calculates a first image quality value according to a predetermined method. For example, the amount of block distortion, the amount of blurring, or the amount of degradation due to missing data caused by transmission errors is calculated as a numeric value. The first image quality value may be a value other than those listed above.

The inter-frame pixel change amount calculating section 602 calculates a pixel change between a frame being currently processed and an immediately preceding frame in the image of interest for evaluation for each predetermined pixel group. The pixel change is represented as a sum of absolute differences in any one of luminance, a color difference and an RGB value, on a pixel-by-pixel basis within the pixel group (sum of inter-frame absolute differences), or as an average of the absolute differences per pixel. While the sum of inter-frame absolute differences is employed here as the inter-frame pixel change amount, other values may be employed insofar as the inter-frame pixel change amount is determined for each predetermined pixel group. For example, a value such as a sum of squared differences may be employed.

It should be noted that the size of the pixel group for which an inter-frame pixel change amount is determined may be different from the size of the pixel group for which an average of pixel values or a statistical quantity of the alternating-current components is calculated. When thus adopting different sizes, the pixel group may be defined as, for example, 16 by 16 pixels, which is a coding unit, for the differential value, or defined to conform to, for example, the shape of an object in a frame for the inter-frame pixel change, whereby the inter-frame pixel change can be more accurately calculated, and degradation specific to coding, such as block distortion, can be calculated.

The first image quality value weighting section 603 applies weighting processing to the first image quality value calculated at the first image quality value calculating section 601. The weighting processing is conducted based on the inter-frame pixel change amount calculated at the inter-frame pixel change amount calculating section 602. In the weighting processing, an inter-frame pixel change amount is compared with a predetermined threshold, and in a case that the inter-frame pixel change amount is smaller than the threshold, the weighting processing is applied to the first image quality value so as to lead to evaluation as poor image quality because the pixel change between frames is small enough to make faint image quality degradation easily detectable. On the other hand, in a case that the inter-frame pixel change amount is larger than the threshold, the weighting processing is applied to the first image quality value so as to lead to evaluation as good image quality because the pixel change between frames is too large to make image quality degradation easily detectable. The number of kinds of the thresholds may be more than one, and in such a case, multi-stage control of weighting processing is allowed. The weight may also be determined by a predetermined function with a variable of the inter-frame pixel change amount.

The second image quality value calculating section 604 calculates a second image quality value (objective image quality value) based on the weighted first image quality value. The second image quality value (objective image quality value) is output as a value such as an average of differential values for every predetermined number of frames, the number being at least one. For example, the second image quality value is output as an average for each frame, an average over a predetermined frame interval (an average per unit frame in a predetermined number of frames), or an average in a whole video. It should be noted that the second image quality value (objective image quality value) may be a value other than the average. For example, it may be output as an S/N ratio obtained with a denominator of squared difference value (alternating-current component differential value), and calculating a logarithm thereof.

The 1st mode of the present invention is characterized in that an image quality evaluation method comprising: calculating a pixel change amount in a pixel group having a predetermined size between predetermined frames in a first image; and based on said pixel change amount, applying weighting processing to a first image quality value calculated based on predetermined data in the first image between at least said predetermined frames to calculate a second image quality value of said first image.

The 2nd mode of the present invention, in the above-mentioned mode, is characterized in that said predetermined frames are a frame of interest for image quality evaluation in image quality evaluation and a frame immediately precedent to said frame of interest for image quality evaluation.

The 3rd mode of the present invention, in the above-mentioned mode, is characterized in that said predetermined frames are a frame of interest for image quality evaluation in image quality evaluation and a frame apart from said frame of interest for image quality evaluation at a predetermined distance.

The 4th mode of the present invention, in the above-mentioned mode, is characterized in that said predetermined frames are a frame of interest for image quality evaluation in image quality evaluation and at least two frames apart from said frame of interest for image quality evaluation at a predetermined distance.

The 5th mode of the present invention, in the above-mentioned mode, is characterized in that the pixel change amount in a pixel group is a sum of absolute differences, which is the sum of absolute differences in luminance, a color difference, or an RGB value in a pixel group between predetermined frames at the same pixel position.

The 6th mode of the present invention, in the above-mentioned mode, is characterized in that the pixel change amount in a pixel group is an average of absolute differences in luminance, a color difference, or an RGB value per unit pixel in a pixel group between predetermined frames at the same pixel position.

The 7th mode of the present invention, in the above-mentioned mode, is characterized in that said weighting processing is applied by comparing said pixel change amount with one or more predetermined threshold, and in a case that said pixel change amount is smaller than said predetermined threshold, multiplying said first image quality value by a predetermined constant greater than one, or in a case that said pixel change amount is greater than said predetermined threshold, multiplying said first image quality value by a predetermined constant smaller than one.

The 8th mode of the present invention, in the above-mentioned mode, is characterized in that said weighting processing is applied to the first image quality value calculated based on predetermined data in the first image also over several frames subsequent to said predetermined frames.

The 9th mode of the present invention, in the above-mentioned mode, is characterized in that said first image and a second image different from said first image are divided into respective pixel groups having a predetermined size, and the first image quality value is obtained as a difference between predetermined data representing said first image and that representing said second image in said respective pixel groups.

The 10th mode of the present invention, in the above-mentioned mode, is characterized in that said difference is any one of a difference in pixel value, including at least one of the luminance, a color difference and RGB, per pixel between said first image and said second image in the same frame and at the same pixel position, a difference in average of said pixel values between said pixel groups, a difference in statistical quantity of the alternating-current components between said pixel groups, and a difference in transform factor between said pixel groups after applying orthogonal transform to pixel values therein.

The 11th mode of the present invention, in the above-mentioned mode, is characterized in that, in a case that said pixel change amount is zero and said first image quality value is greater than a predetermined threshold, said first image quality value is multiplied by zero to ignore said first image quality value.

The 12th mode of the present invention, in the above-mentioned mode, is characterized in that a constant to be multiplied for use in the weighting processing is derived from a predetermined function with an argument of said pixel change amount.

The 13th mode of the present invention is characterized in that an image quality evaluation system comprising: a pixel change amount calculating section for calculating a pixel change amount in a pixel group having a predetermined size between predetermined frames in a first image; and an image quality value calculating section for, based on said pixel change amount, applying weighting processing to a first image quality value calculated based on predetermined data in the first image between at least said predetermined frames to calculate a second image quality value of said first image.

The 14th mode of the present invention, in the above-mentioned mode, is characterized in that said predetermined frames are a frame of interest for image quality evaluation in image quality evaluation and a frame immediately precedent to said frame of interest for image quality evaluation.

The 15th mode of the present invention, in the above-mentioned mode, is characterized in that said predetermined frames are a frame of interest for image quality evaluation in image quality evaluation and a frame apart from said frame of interest for image quality evaluation at a predetermined distance.

The 16th mode of the present invention, in the above-mentioned mode, is characterized in that said predetermined frames are a frame of interest for image quality evaluation in image quality evaluation and at least two frames apart from said frame of interest for image quality evaluation at a predetermined distance.

The 17th mode of the present invention, in the above-mentioned mode, is characterized in that said pixel change amount calculating section calculates a sum of absolute differences, which is the sum of absolute differences in luminance, a color difference, or an RGB value in a pixel group between predetermined frames at the same pixel position, as said pixel change amount in a pixel group.

The 18th mode of the present invention, in the above-mentioned mode, is characterized in that said pixel change amount calculating section calculates an average of absolute differences in luminance, a color difference, or an RGB value per unit pixel in a pixel group between predetermined frames at the same pixel position, as said pixel change amount in a pixel group.

The 19th mode of the present invention, in the above-mentioned mode, is characterized in that said image quality value calculating section compares said pixel change amount with one or more predetermined threshold, and in a case that said pixel change amount is smaller than said predetermined threshold, multiplies said first image quality value by a predetermined constant greater than one, or in a case that said pixel change amount is greater than said predetermined threshold, multiplies said first image quality value by a predetermined constant smaller than one.

The 20th mode of the present invention, in the above-mentioned mode, is characterized in that said image quality value calculating section applies the weighting processing to the first image quality value calculated based on predetermined data in the first image also over several frames subsequent to said predetermined frames.

The 21st mode of the present invention, in the above-mentioned mode, is characterized in that the image quality evaluation system comprising a first image quality value calculating section for dividing said first image and a second image different from said first image into respective pixel groups having a predetermined size, and calculating the first image quality value as a difference between predetermined data representing said first image and predetermined data representing said second image in said respective pixel groups.

The 22nd mode of the present invention, in the above-mentioned mode, is characterized in that said difference is any one of a difference in pixel value, including at least one of the luminance, a color difference and RGB, per pixel between said first image and said second image in the same frame and at the same pixel position, a difference in average of said pixel values between said pixel groups, a difference in statistical quantity of the alternating-current components between said pixel groups, and a difference in transform factor between said pixel groups after applying orthogonal transform to pixel values therein.

The 23rd mode of the present invention, in the above-mentioned mode, is characterized in that, in a case that said pixel change amount is zero and said first image quality value is greater than a predetermined threshold, said image quality value calculating section multiplies said first image quality value by zero to ignore said first image quality value.

The 24th mode of the present invention, in the above-mentioned mode, is characterized in that said image quality value calculating section derives a constant to be multiplied for use in the weighting processing from a predetermined function with an argument of said pixel change amount.

The 25th mode of the present invention is characterized in that a program causing an information processing apparatus to execute: pixel change amount calculation processing of calculating a pixel change amount in a pixel group having a predetermined size between predetermined frames in a first image; and image quality value calculation processing of, based on said pixel change amount, applying weighting processing to a first image quality value calculated based on predetermined data in the first image between at least said predetermined frames to calculate a second image quality value of said first image.

The 26th mode of the present invention, in the above-mentioned mode, is characterized in that said pixel change amount calculation processing calculates a sum of absolute differences, which is the sum of absolute differences in luminance, a color difference, or an RGB value in a pixel group between adjacent frames at the same pixel position, as said pixel change amount in a pixel group.

The 27th mode of the present invention, in the above-mentioned mode, is characterized in that said pixel change amount calculation processing calculates an average of absolute differences in luminance, a color difference, or an RGB value per unit pixel in a pixel group between adjacent frames at the same pixel position, as said pixel change amount in a pixel group.

The 28th mode of the present invention, in the above-mentioned mode, is characterized in that said image quality value calculation processing comprises comparing said pixel change amount with one or more predetermined threshold, and in a case that said pixel change amount is smaller than said predetermined threshold, multiplying said first image quality value by a predetermined constant greater than one, or in a case that said pixel change amount is greater than said predetermined threshold, multiplying said first image quality value by a predetermined constant smaller than one.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-118347, filed on Apr. 30, 2008, the disclosure of which is incorporated herein in its entirety by reference.

The invention claimed is:

1. An image evaluation method comprising:
   calculating an average of absolute differences in one of luminance, a color difference, and an RGB value per unit pixel in a pixel group between a first frame and a second frame previous of said first frame at the same pixel position in a video, as a pixel change amount, said pixel group is a block that is obtained by dividing a plurality of pixels of a frame; and
   calculating a second image quality value of a first image of said video by weighting a first image quality value, said weighting based on said pixel change amount, said first image quality value being calculated based on predetermined data between said predetermined frames in said video,
   wherein said weighting is applied by comparing said pixel change amount with at least one predetermined threshold, and
   wherein when said pixel change amount is not greater than a first predetermined threshold, multiplying said first image quality value by a first predetermined constant, and when said pixel change amount is greater than a second predetermined threshold, multiplying said first image quality value by a second predetermined constant.

2. An image evaluation method according to claim 1, wherein said predetermined frames are a frame of interest for image quality evaluation and a frame immediately precedent to said frame of interest for image quality evaluation.

3. An image evaluation method according to claim 1, wherein said predetermined frames are a frame of interest for image quality evaluation and a frame apart from said frame of interest for image quality evaluation at a predetermined distance.

4. An image evaluation method according to claim 1, wherein said predetermined frames are a frame of interest for image quality evaluation and at least two frames apart from said frame of interest for image quality evaluation at a predetermined distance.

5. An image evaluation method according to claim 1, wherein
the first predetermined constant is greater than one, and the second predetermined constant is less than one.

6. An image evaluation method according to claim 1, wherein the first image quality value is calculated based on predetermined data in the video over several frames subsequent to said predetermined frames.

7. An image evaluation method according to claim 6, wherein said first image and a second image of the video, said second image being different from said first image, are divided into respective pixel groups having a predetermined size, and the first image quality value is obtained as a difference between predetermined data representing said first image and that representing said second image in said respective pixel groups.

8. An image evaluation method according to claim 5, wherein said first and second differences are each any one of a difference in pixel value, including at least one of the luminance, a color difference and an RGB value, per pixel between said first image and said second image in said pixel group between predetermined frames at the same pixel position, a difference in average of said pixel values between said pixel groups, a difference in statistical quantity between said pixel groups, and a difference in transform factor between said pixel groups after applying orthogonal transform to pixel values therein.

9. An image evaluation method according to claim 5, wherein, when said pixel change amount is zero and said first image quality value is greater than a predetermined threshold, said first image quality value is multiplied by zero to ignore said first image quality value.

10. An image evaluation method according to claim 5, wherein a constant to be multiplied for use in the weighting is derived from a predetermined function with an argument of said pixel change amount.

11. An image evaluation method according to claim 1, wherein said pixel group is a square block that is obtained by dividing a plurality of pixels of a frame, and said square block has a plurality of pixels.

12. An image evaluation system comprising:
a pixel change amount calculator that calculates an average of absolute differences in one of luminance, a color difference, and an RGB value per unit pixel in a pixel group between a first frame and a second frame previous of said first frame at the same pixel position in a video, as a pixel change amount, said pixel group is a block that is obtained by diving a plurality of pixels of a frame; and
an image quality value calculator that calculates a second image quality value of a first image of said video by weighting a first image quality value, said weighting based on said pixel change amount, said first image quality value being calculated based on predetermined data between said predetermined frames in said video,
wherein said image quality value calculator compares said pixel change amount with at least one predetermined threshold,
and wherein when said pixel change amount is not greater than a first predetermined threshold, multiplies said first image quality value by a first predetermined constant, and
when said pixel change amount is greater than a second predetermined threshold, multiplies said first image quality value by a predetermined constant.

13. An image evaluation system according to claim 12, wherein said predetermined frames are a frame of interest for image quality evaluation and a frame immediately precedent to said frame of interest for image quality evaluation.

14. An image evaluation system according to claim 12, wherein said predetermined frames are a frame of interest for image quality evaluation and a frame apart from said frame of interest for image quality evaluation at a predetermined distance.

15. An image evaluation system according to claim 12, wherein said predetermined frames are a frame of interest for image quality evaluation and at least two frames apart from said frame of interest for image quality evaluation at a predetermined distance.

16. An image evaluation system according to claim 12, wherein
the first predetermined constant is greater than one and the second predetermined constant is less than one.

17. An image evaluation system according to claim 12, wherein the first image quality value is calculated based on predetermined data in the first image over several frames subsequent to said predetermined frames.

18. An image evaluation system according to claim 16, comprising a first image quality value calculator that divides said first image and a second image of the video, said second image being different from said first image into respective pixel groups having a predetermined size, and calculates the first image quality value as a difference between predetermined data representing said first image and predetermined data representing said second image in said respective pixel groups.

19. An image evaluation system according to claim 16, wherein said first and second differences are each any one of a difference in pixel value, including at least one of the luminance, a color difference and an RGB value, per pixel between said first image and said second image in the same frame and at the same pixel position, a difference in average of said pixel values between said pixel groups, a difference in statistical quantity between said pixel groups, and a difference in transform factor between said pixel groups after applying orthogonal transform to pixel values therein.

20. An image evaluation system according to claim 16, wherein, when said pixel change amount is zero and said first image quality value is greater than a predetermined threshold, said image quality value calculator multiplies said first image quality value by zero to ignore said first image quality value.

21. An image evaluation system according to claim 16, wherein said image quality value calculator derives a constant to be multiplied for use in the weighting processing from a predetermined function with an argument of said pixel change amount.

22. A non-transitory computer readable storage medium storing a program causing an information processing apparatus to execute:
pixel change amount calculation processing of calculating an average of absolute differences in one of luminance, a color difference, and an RGB value per unit pixel in a pixel group between a first frame and a second frame previous of said first frame at the same pixel position in a video, as a pixel change amount, said pixel group is a block that is obtained by dividing a plurality of pixels of a frame; and image quality value calculation processing of calculating a second image quality value of a first image of said video by weighting a first image quality value, said weighting based on said pixel change amount, said first image quality value being calculated based on predetermined data between said predetermined frames in said video, wherein said image quality value calculation processing comprises comparing said pixel change amount with at least one predetermined threshold, and wherein when said pixel change amount is not greater than a first predetermined threshold, multiplying said first image quality value by a first predetermined constant, and when said pixel change amount is greater than a second predetermined threshold, multiplying said first image quality value by a second predetermined constant.

23. A non-transitory computer readable storage medium according to claim 22, wherein the first predetermined constant is greater than one, and
the second predetermined constant is less than one.

* * * * *